(12) United States Patent
Nanukuttan et al.

(10) Patent No.: US 8,038,398 B2
(45) Date of Patent: Oct. 18, 2011

(54) SYSTEM AND METHOD OF DISTRIBUTING AIR WITHIN A WIND TURBINE (75) Inventors: Biju Nanukuttan, Jabalpur (IN); Sumit Bose, Niskayuna, NY (US); Ganesh Neogi, Dharwad (IN); Shalu Asarikandy, Kozhikode (IN); Jing Wang, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/899,324

(22) Filed: Oct. 6, 2010

(65) Prior Publication Data

US 2011/0142623 A1   Jun. 16, 2011

(51) Int. Cl.
  *F03D 11/00* (2006.01)
(52) U.S. Cl. .......................................... 416/39; 415/175
(58) Field of Classification Search .............. 416/231 R, 416/39
  See application file for complete search history.

(56) References Cited

U.S. PATENT DOCUMENTS

| 4,976,397 A | 12/1990 | Rudolph et al. | |
| 6,676,122 B1 * | 1/2004 | Wobben | 290/55 |
| 7,217,091 B2 | 5/2007 | LeMieux | |
| 7,575,196 B2 | 8/2009 | Chapman et al. | |
| 2004/0041408 A1 * | 3/2004 | Casazza | 290/55 |
| 2010/0119370 A1 | 5/2010 | Myhr | |
| 2010/0266382 A1 * | 10/2010 | Campe et al. | 415/1 |
| 2010/0308596 A1 * | 12/2010 | Gawrisch et al. | 290/55 |

FOREIGN PATENT DOCUMENTS

JP    2005069082 A  *  3/2005

OTHER PUBLICATIONS

JP 2005-69082 Machine Translation. Accessed Mar. 9, 2011.*

* cited by examiner

*Primary Examiner* — Richard Edgar
(74) *Attorney, Agent, or Firm* — James McGinness, Esq.; Armstrong Teasdale LLP (57) ABSTRACT

An air distribution system for use with a wind turbine. The wind turbine includes a nacelle that is coupled to a tower and a rotor that is rotatably coupled to the nacelle with a rotor shaft. The rotor includes at least one rotor blade that is coupled to a hub. The air distribution system includes a conduit that is defined within the rotor shaft. The conduit provides flow communication between the nacelle and the rotor. An air-flow control assembly is coupled in flow communication with the conduit. The air-flow control assembly is configured to selectively channel air from the nacelle to the rotor and from the nacelle to ambient air.

20 Claims, 6 Drawing Sheets

SYSTEM AND METHOD OF DISTRIBUTING AIR WITHIN A WIND TURBINE

BACKGROUND OF THE INVENTION

The subject matter described herein relates generally to a system and method of distributing air within a wind turbine.

At least some known wind turbine towers include a nacelle fixed atop a tower. The nacelle includes a rotor assembly coupled to a generator through a rotor shaft. In known rotor assemblies, a plurality of blades extend from a rotor. The blades are oriented such that wind passing over the blades turns the rotor and rotates the shaft, thereby driving the generator to generate electricity.

In at least some known wind turbines, various wind turbine components are positioned within the tower and/or the nacelle. During operation of known wind turbines, the wind turbine components generate heat which increases a temperature of the tower and/or the nacelle. As the temperature of the tower and/or the nacelle is increased, the operation of the wind turbine components may be adversely affected.

Because many known wind turbines provide electrical power to utility grids, at least some wind turbines have larger components (e.g., rotors in excess of thirty meters in diameter) that facilitate supplying greater quantities of electrical power. However, the larger components are often subjected to increased loads (e.g., asymmetric loads) that result from wind shears, yaw misalignment, and/or turbulence. In addition, at least some known wind turbines are subjected to ambient temperatures that may result in the formation of ice across known rotor blades. The formation of ice across known rotor blades may contribute to significant fatigue cycles on the rotor blade and/or other components of the wind turbine. As the wind turbine components become worn, the wind turbine becomes less effective generating electricity.

BRIEF DESCRIPTION OF THE INVENTION

In one aspect, an air distribution system for use with a wind turbine is provided. The wind turbine includes a nacelle that is coupled to a tower and a rotor that is rotatably coupled to the nacelle with a rotor shaft. The rotor includes at least one rotor blade that is coupled to a hub. The air distribution system includes a conduit that is defined within the rotor shaft. The conduit provides flow communication between the nacelle and the rotor. An air-flow control assembly is coupled in flow communication with the conduit. The air-flow control assembly is configured to selectively channel air from the nacelle to the rotor and from the nacelle to ambient air.

In another aspect, a wind turbine is provided. The wind turbine includes a tower, a nacelle that is coupled to the tower, a generator that is positioned within the nacelle, a rotor that includes at least one rotor blade that is coupled to a hub, and a rotor shaft that rotatably couples the rotor to the generator. An air distribution system is coupled to the nacelle. The air distribution system includes a conduit that is defined through the rotor shaft. The conduit provides flow communication between the nacelle and the rotor. An air-flow control assembly is coupled in flow communication with the conduit. The air-flow control assembly is configured to selectively channel air from the nacelle to the rotor and from the nacelle to ambient air.

In yet another aspect, a method of distributing air within a wind turbine is provided. The wind turbine includes a nacelle that is coupled to a tower, and a rotor that is coupled to the nacelle with a rotor shaft. The rotor includes at least one rotor blade that is coupled to a hub. The method includes coupling an air-flow control assembly in flow communication with the nacelle, the rotor, and ambient air. The air-flow control assembly is operated in one of a plurality of operational modes. The air-flow control assembly channels air from the nacelle to the rotor in a first operational mode of the plurality of operational modes. The air-flow control assembly channels air from the nacelle to ambient air in a second operational mode of the plurality of operational modes.

DETAILED DESCRIPTION OF THE INVENTION

The embodiments described herein facilitate channeling air between a nacelle and a hub of a wind turbine to adjust a temperature within the wind turbine. More specifically, the wind turbine described herein includes an air distribution system that is configured to selectively channel air from the nacelle to the hub and from the nacelle to ambient air. Moreover, the air distribution system described herein includes an active-flow control assembly for adjusting an aerodynamic efficiency of a wind turbine rotor blade to increase an annual energy production of the wind turbine. As used herein, the term "aerodynamic efficiency" refers to a ratio of aerodynamic lift to the aerodynamic drag of the rotor blade. As used herein, the term "annual energy production" refers to the cumulative electrical energy produced by a wind turbine during a calendar year. In addition, the air distribution system includes a de-icing assembly that facilitates increasing a temperature of a rotor blade to prevent a formation of ice across the rotor blade.

Figure 1:
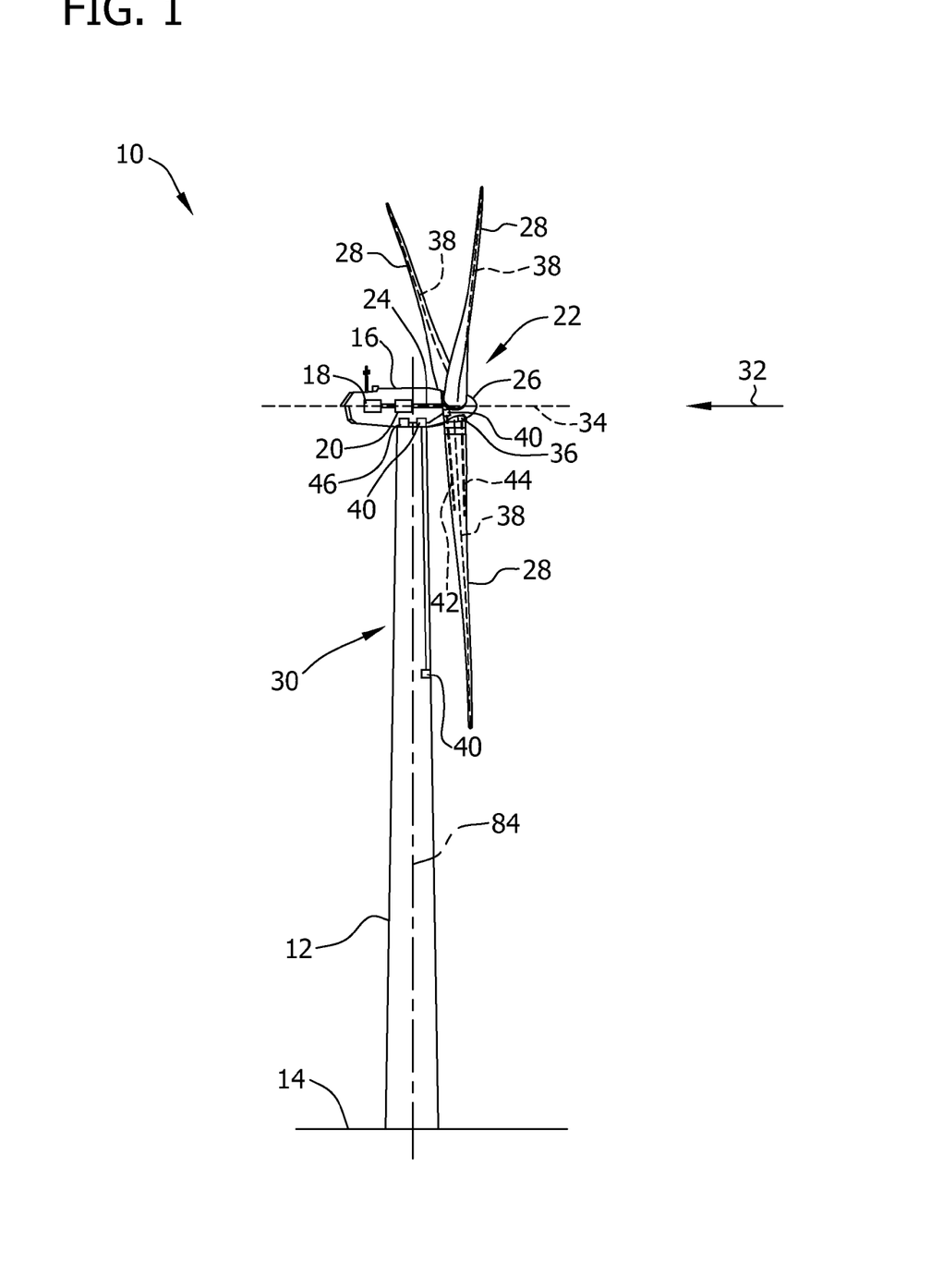
FIG. 1 is a perspective view of an exemplary wind turbine including an exemplary air distribution system.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, a generator 18 positioned within nacelle 16, and a gearbox 20 that is coupled to generator 18. A rotor 22 is rotatably coupled to gearbox 20 with a rotor shaft 24. Rotor 22 includes a rotatable hub 26 and at least one rotor blade 28 that extends outwardly from hub 26. Wind turbine 10 also includes an air distribution system 30 for selectively channeling air between tower 12, nacelle 16, and rotor 22.

In the exemplary embodiment, rotor 22 includes three rotor blades 28. In an alternative embodiment, rotor 22 includes more or less than three rotor blades 28. Rotor blades 28 are spaced about hub 26 to facilitate rotating rotor 22 to enable kinetic energy to be transferred from the wind into usable mechanical energy, and subsequently, electrical energy. In the exemplary embodiment, each rotor blade 28 has a length ranging from about 30 meters (m) (99 feet (ft)) to about 120 m (394 ft). Alternatively, rotor blades 28 may have any suitable length that enables wind turbine 10 to function as described herein. For example, other non-limiting examples of rotor blade lengths include 10 m or less, 20 m, 37 m, or a length that is greater than 120 m. As wind strikes rotor blades 28 from a direction 32, rotor 22 is rotated about an axis of rotation 34. As rotor blades 28 are rotated and subjected to centrifugal forces, rotor blades 28 are also subjected to various forces and moments. As such, rotor blades 28 may deflect and/or rotate from a neutral, or non-deflected, position to a deflected position. A pitch angle or blade pitch of each rotor blade 28, i.e., an angle that determines a perspective of rotor blade 28 with respect to direction 32 of the wind, may be changed by a pitch adjustment system 36 to control the oscillation, load, and/or power generated by wind turbine 10 by adjusting an angular position of rotor blade 28 about a pitch axis 38 relative to wind vectors.

In the exemplary embodiment, air distribution system 30 includes an air-flow control assembly 40 that is operatively coupled to an active-flow control assembly 42 and to a de-icing assembly 44 for selectively channeling air from nacelle 16 to active-flow control assembly 42 and to de-icing assembly 44. Air-flow control assembly 40 is also coupled to tower 12, to nacelle 16, and to hub 26 for selectively channeling air between tower 12, nacelle 16, and hub 26. Active-flow control assembly 42 is coupled to at least one rotor blade 28 for manipulating a boundary layer across rotor blade 28. De-icing assembly 44 is coupled to at least one rotor blade 28 for increasing a temperature of rotor blade 28. Air distribution system 30 also includes a control system 46 that is coupled in operative communication with air-flow control assembly 40, active-flow control assembly 42, and de-icing assembly 44.

During operation of wind turbine 10, various wind turbine components such as, for example generator 18, gearbox 20, and/or pitch adjustment system 36, may increase a temperature within wind turbine 10. Air-flow control assembly 40 selectively channels air from tower 12 to nacelle 16 and from nacelle 16 to hub 26 to facilitate reducing a temperature of tower 12, nacelle 16, and/or hub 26. Moreover, air-flow control assembly 40 channels air from hub 26 to active-flow control assembly 42 and/or de-icing assembly 44. Active-flow control assembly 42 channels air from air-flow control assembly 40 through rotor blade 28 to facilitate manipulating a boundary layer across rotor blade 28. De-icing assembly 44 channels from air-flow control assembly 40 through rotor blade 28 to facilitate increasing a temperature of rotor blade 28 to reduce an accumulation of ice across rotor blade 28.

Figure 2:
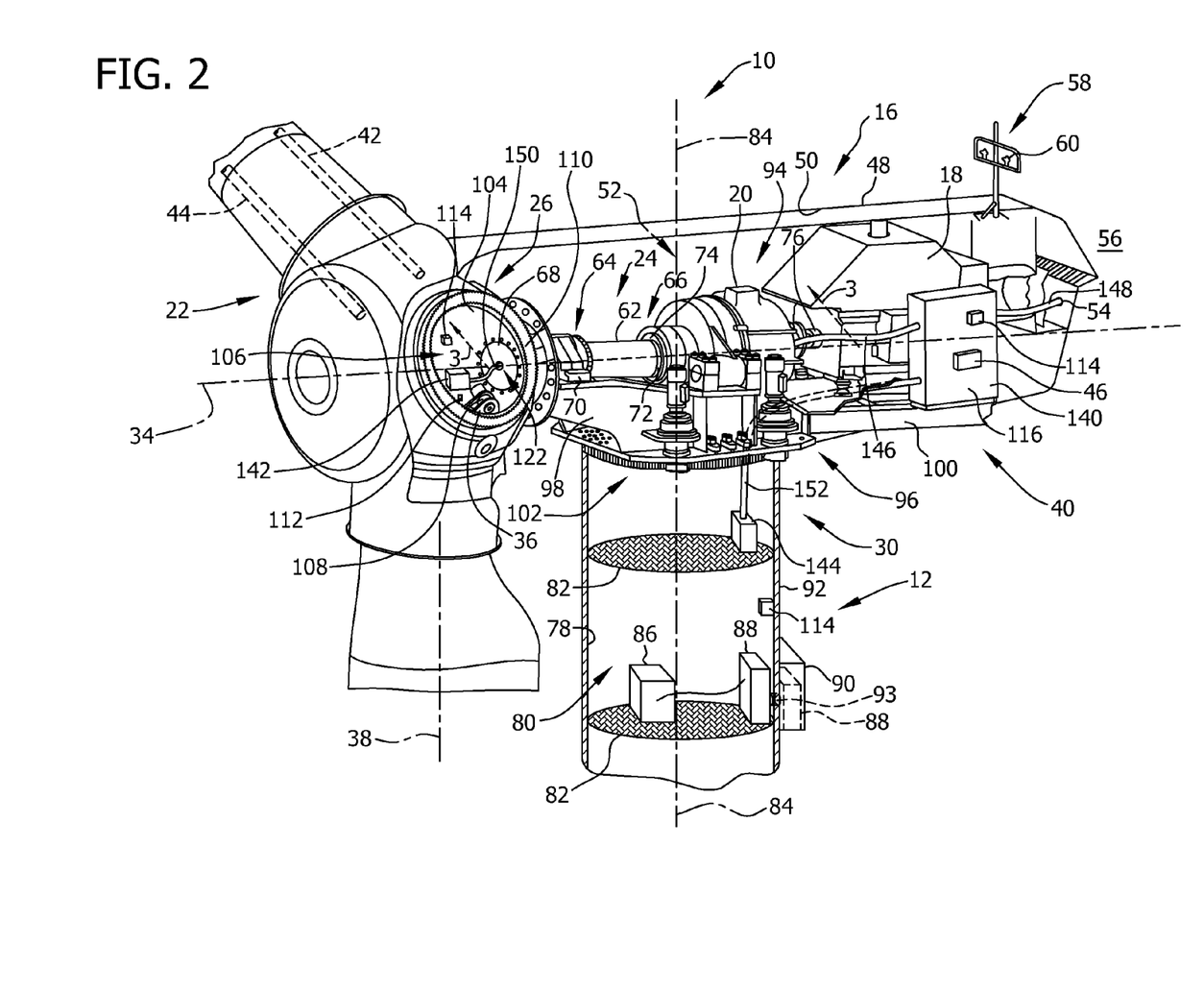
FIG. 2 is an enlarged perspective partial sectional view of a portion of the wind turbine shown in FIG. 1 including an exemplary air distribution system.
Figure 3:
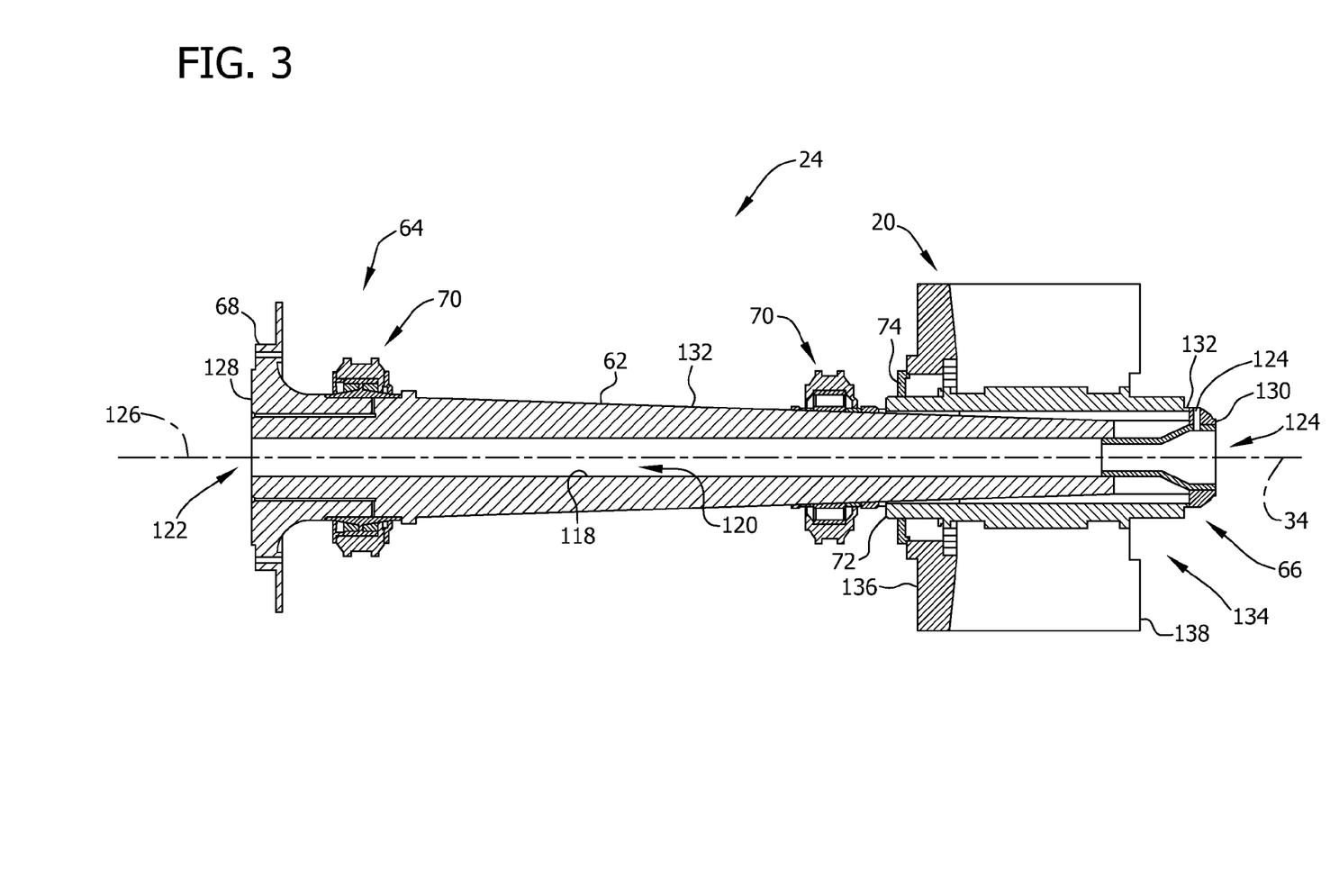
FIG. 3 is a cross-sectional view of an exemplary rotor shaft suitable for use with the wind turbine shown in FIG. 1.

FIG. 2 is an enlarged perspective partial sectional view of a portion of wind turbine 10. FIG. 3 is a cross-sectional view of rotor shaft 24 along section lines 3-3 in FIG. 2. Identical components shown in FIG. 3 are labeled with the same reference numbers used in FIG. 2. In the exemplary embodiment, nacelle 16 includes a housing 48 having an inner surface 50. Inner surface 50 defines a nacelle cavity 52. At least one aperture 54 extends through housing 48 to provide flow communication between nacelle cavity 52 and ambient air 56. Rotor shaft 24, gearbox 20, generator 18, and air distribution system 30 are at least partially positioned within nacelle cavity 52. Nacelle 16 also includes at least one meteorological mast 58 that includes a sensor 60 such as an anemometer. Sensor 60 is configured to sense a wind direction and/or a wind velocity of wind, for example, and transmit a signal indicative of wind direction 32 and/or the wind velocity to control system 46.

Rotor shaft 24 includes a body 62 that extends between a first end 64 and an opposite second end 66. First end 64 is coupled to rotor 22. More specifically, rotor shaft 24 includes a rotor flange 68 that is coupled to rotor shaft first end 64. Hub 26 is coupled to rotor flange 68 such that hub 26 rotates about axis 34 to facilitate rotating rotor shaft 24 about axis 34. At least one shaft support bearing 70 is coupled to rotor shaft 24 to facilitate radial support and alignment of rotor shaft 24. Alternatively, wind turbine 10 may include any number of support bearings that enable wind turbine 10 to function as described herein. Second end 66 is rotatably coupled to gearbox 20. Gearbox 20 includes an input shaft 72 that is configured to receive second end 66 of rotor shaft 24. A shrink disk 74 is coupled to input shaft 72 and extends radially outwardly from input shaft 72 such that input shaft 72 is between shrink disk 74 and rotor shaft 24. Shrink disk 74 is configured to compress input shaft 72 to facilitate coupling input shaft 72 to rotor shaft 24 via a friction fit. A high speed shaft 76, shown in FIG. 2, is coupled between gearbox 20 and generator 18.

Tower 12 includes an inner surface 78 that defines a tower cavity 80 that extends between supporting surface 14 (shown in FIG. 1) and nacelle 16. Tower 12 is coupled to nacelle 16 such that tower cavity 80 is in flow communication with nacelle cavity 52. Tower 12 includes one or more support platforms 82 that are coupled to inner surface 78 of tower 12. Each support platform 82 is vertically spaced along a centerline axis 84 of tower 12 and is configured to support various equipment such as, for example a power transformer 86 and a power converter 88. Power transformer 86 and power converter 88 are each electrically coupled to generator 18 and to a power grid (not shown) with electrical conduits (not shown) for transmitting power between generator 18 and the power grid (not shown). In the exemplary embodiment, power transformer 86 and power converter 88 are each positioned within tower 12. In one embodiment, power transformer 86 and/or power converter 88 may be positioned within at least one enclosure 90 that is positioned adjacent to an outer surface 92 of tower 12. In this embodiment, a conduit 93 is coupled between outer surface 92 and enclosure 90 to provide flow communication between enclosure 90 and tower cavity 80. Alternatively, enclosure 90 may be coupled to outer surface 92.

During operation of wind turbine 10, rotor shaft 24 rotatably drives gearbox 20 that subsequently drives high speed shaft 76. High speed shaft 76 rotatably drives generator 18 to facilitate production of electrical power by generator 18. In one embodiment, wind turbine 10 does not include gearbox 20. In this embodiment, second end 66 of rotor shaft 24 is coupled to generator 18 via input shaft 72. Rotor shaft 24, generator 18, gearbox 20, high speed shaft 76, and any associated fastening and/or support device including, but not limited to, shaft support bearing 70, are sometimes referred to as a drivetrain 94. In the exemplary embodiment, drivetrain 94 is supported by a drivetrain support assembly 96. Drivetrain support assembly 96 includes a bedplate support frame 98 and a generator frame 100 that is cantilevered from bedplate support frame 98. Gearbox 20, rotor shaft 24, and shaft support bearing 70 are each supported by bedplate support frame 98. Generator 18 is supported by generator frame 100. Bedplate support frame 98 defines a bedplate opening 102 that provides flow communication between tower cavity 80 and nacelle cavity 52.

In the exemplary embodiment, hub 26 includes an inner surface 104 that defines a hub cavity 106. Hub 26 is coupled to nacelle 16 such that hub cavity 106 is in flow communication with nacelle cavity 52. Pitch adjustment system 36 includes at least one pitch drive 108 that is positioned within hub cavity 106. At least one pitch bearing 110 is coupled to hub 26 and to respective rotor blade 28 for supporting respective rotor blade 28 from hub 26 and to rotate respective rotor blade 28 about pitch axis 38. Each pitch drive 108 is coupled to a respective pitch bearing 110 for modulating the pitch angle of associated rotor blade 28 along pitch axis 38. Only one of three pitch adjustment systems 36 is shown in FIG. 2. Pitch adjustment system 36 includes a pitch sensor 112 for transmitting a signal indicative of a pitch angle of rotor blade 28 to control system 46.

Wind turbine 10 also includes a plurality of temperature sensors 114 that are coupled to tower 12, nacelle 16, hub 26, and/or rotor blade 28. Temperature sensors 114 are configured to sense a temperature of tower 12, nacelle 16, hub 26, and/or rotor blade 28 and transmit a signal indicative of the temperature to control system 46.

In the exemplary embodiment, air-flow control assembly 40 includes at least one flow control assembly 116 that is coupled in flow communication with tower cavity 80, nacelle cavity 52, hub cavity 106 and aperture 54. Flow control assembly 116 is, for example, a pump, a compressor, a fan, a blower, and/or any other suitable device for controlling a flow of air. In the exemplary embodiment, flow control assembly 116 is configured to channel air from tower cavity 80 and/or nacelle cavity 52 to hub cavity 106. Flow control assembly 116 is further configured to channel air from nacelle cavity 52 to ambient air 56 through aperture 54. Moreover, flow control assembly 116 is configured to selectively channel air from tower cavity 80 and/or nacelle cavity 52 to hub cavity 106 and aperture 54.

Referring to FIG. 3, in the exemplary embodiment, rotor shaft 24 has an inner surface 118 that defines a shaft conduit 120 that extends between first end 64 and second end 66. Shaft conduit 120 extends between a first opening 122 and a second opening 124 and extends generally along a centerline axis 126 of rotor shaft 24. Shaft conduit 120 provides flow communication between nacelle cavity 52 and hub cavity 106. First opening 122 is defined by a forward surface 128 of rotor flange 68 and provides flow communication between hub cavity 106 and shaft conduit 120. Second opening 124 is defined by an end surface 130 of second end 66 and provides flow communication between nacelle cavity 52 and shaft conduit 120. End surface 130 extends between an outer surface 132 and inner surface 118. In an alternative embodiment, second opening 124 is defined by outer surface 132 of rotor shaft 24 and extends between outer surface 132 and inner surface 118. In the exemplary embodiment, gearbox 20 defines a bore 134 that extends between a first surface 136 and a second surface 138 and is sized to receive rotor shaft 24 and input shaft 72. Rotor shaft 24 is coupled to gearbox 20 such that rotor shaft 24 extends at least partially through bore 134. In the exemplary embodiment, second end 66 extends outwardly from second surface 138 along axis 126. In an alternative embodiment, second end 66 is positioned within bore 134.

Referring again to FIG. 2, in the exemplary embodiment, air-flow control assembly 40 includes a first flow control assembly 140 positioned within nacelle 16, a second flow control assembly 142 positioned within hub 26, and a third flow control assembly 144 positioned within tower 12. First flow control assembly 140 is coupled to shaft conduit 120 (shown in FIG. 3) for channeling air from nacelle cavity 52 to hub cavity 106 through shaft conduit 120. First flow control assembly 140 is also coupled to aperture 54 for channeling air from nacelle cavity 52 to ambient air 56 through aperture 54. First flow control assembly 140 is configured to selectively channel air from nacelle cavity 52 to hub cavity 106 and/or ambient air 56. In one embodiment, first flow control assembly 140 includes a first conduit 146 and a second conduit 148.

First conduit 146 is coupled between first flow control assembly 140 and second opening 124 (shown in FIG. 3) to provide flow communication between first flow control assembly 140 and shaft conduit 120. Second conduit 148 is coupled between first flow control assembly 140 and aperture 54 to provide flow communication between first flow control assembly 140 and aperture 54.

In the exemplary embodiment, second flow control assembly 142 is positioned within hub 26 and is configured to channel air from hub cavity 106 to rotor blades 28. Second flow control assembly 142 is coupled in flow communication with shaft conduit 120 for receiving air from first flow control assembly 140. In one embodiment, second flow control assembly 142 includes a conduit 150 that is coupled between second flow control assembly 142 and first opening 122 to provide flow communication between second flow control assembly 142 and shaft conduit 120 (shown in FIG. 3). Alternatively, second flow control assembly 142 does not include conduit 150, and is configured to receive air that is discharged into hub cavity 106 from shaft conduit 120. In the exemplary embodiment, second flow control assembly 142 is coupled to active-flow control assembly 42 for channeling air from hub cavity 106 and/or shaft conduit 120 to active-flow control assembly 42. Second flow control assembly 142 is further coupled to de-icing assembly 44 for channeling air from hub cavity 106 and/or conduit 150 to de-icing assembly 44. In the exemplary embodiment, second flow control assembly 142 is configured to selectively channel air from first flow control assembly 140 to active-flow control assembly 42 and/or de-icing assembly 44.

In the exemplary embodiment, third flow control assembly 144 is positioned within tower 12 and is configured to channel air from tower cavity 80 to nacelle cavity 52. Moreover, third flow control assembly 144 is configured to channel air from tower cavity 80 to first flow control assembly 140. In one embodiment, third flow control assembly 144 includes at least one conduit 152 that is coupled between third flow control assembly 144 and first flow control assembly 140. Alternatively, third flow control assembly 144 does not include conduit 152, and is configured to discharge air from tower cavity 80 into nacelle cavity 52 through bedplate opening 102. In a further embodiment, third flow control assembly 144 is coupled in flow communication with enclosure 90 for receiving air from enclosure 90.

Figure 4:
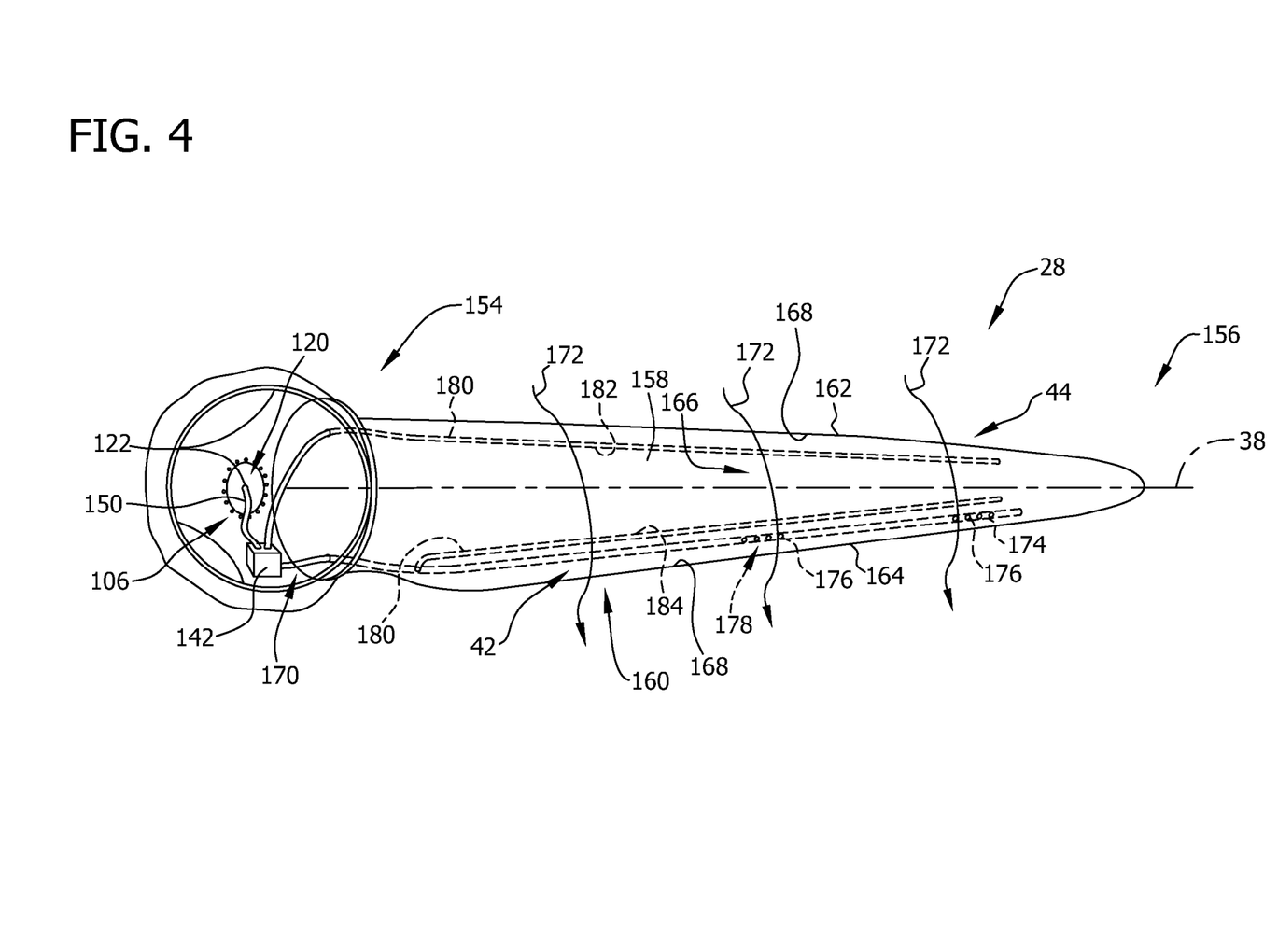
FIG. 4 is a partial cross-sectional view of a portion of an exemplary rotor suitable for use with the wind turbine shown in FIG. 1.

FIG. 4 is a partial cross-sectional view of a portion of rotor 22. Identical components shown in FIG. 4 are labeled with the same reference numbers used in FIG. 2 and FIG. 3. In the exemplary embodiment, rotor blades 28 are identical and each includes a first or root end 154 configured to facilitate mounting rotor blade 28 to hub 26 and a second or tip end 156 opposing root end 154. Rotor blade 28 further includes a first or suction sidewall 158 and a cooperating second or pressure sidewall 160. Pressure sidewall 160 is coupled to suction sidewall 158 along a leading edge 162 and along an opposing trailing edge 164. Suction sidewall 158 and pressure sidewall 160 are coupled together to define a rotor blade cavity 166 that extends along at least a portion of rotor blade 28 between root end 154 to tip end 156. More specifically, pressure sidewall 160 and suction sidewall 158 each include an inner surface 168 that defines rotor blade cavity 166. In the exemplary embodiment, pressure sidewall 160 and suction sidewall 158 are coupled together to form an opening 170 at root end 154. Rotor blade 28 is coupled to hub 26 at root end 154 such that opening 170 provides flow communication between hub cavity 106 and rotor blade cavity 166.

In the exemplary embodiment, active-flow control assembly 42 is coupled to each rotor blade 28 and is configured to discharge air from rotor blade 28 into a boundary layer, represented by arrow 172, defined across rotor blade 28 to manipulate boundary layer 172 and to facilitate increasing the aerodynamic efficiency of rotor blade 28. Active-flow control assembly 42 includes a manifold 174 that is positioned within respective rotor blade cavity 166 and is coupled to inner surface 168. A plurality of apertures 176 extend through pressure sidewall 160 and/or suction sidewall 158 and are coupled to manifold 174 to provide flow communication between manifold 174 and ambient air 56. In the exemplary embodiment, apertures 176 are aligned axially in a single row 178 that extends generally along pitch axis 38 of respective rotor blade 28. In one embodiment, apertures 176 are defined at or near trailing edge 164 of rotor blade 28. In an alternative embodiment, apertures 176 are defined at or near leading edge 162 and/or trailing edge 164 of rotor blade 28. In a further alternative embodiment, apertures 176 are aligned in any suitable array, in a single row, or in multiple rows at any suitable location along the length of rotor blade 28 that enables active-flow control assembly 42 to function as described herein. During operation, manifold 174 receives air from air-flow control assembly 40 and discharges the flow of air into boundary layer 172 through apertures 176. In one embodiment, manifold 174 is coupled to second flow control assembly 142. Alternatively, air-flow control assembly 40 does not include second flow control assembly 142. In such an embodiment, active-flow control assembly 42 is configured to receive air from first flow control assembly 140 through hub cavity 106. In a further alternative embodiment, active-flow control assembly 42 is coupled to shaft conduit 120 (shown in FIG. 3) for receiving air from first flow control assembly 140.

In the exemplary embodiment, de-icing assembly 44 is coupled to each rotor blade 28 to facilitate increasing a temperature of rotor blade 28 to reduce an accumulation of ice and/or snow across rotor blade 28. De-icing assembly 44 includes at least one de-icing conduit 180 that is positioned within rotor blade cavity 166 and is coupled to inner surface 168. In one embodiment, de-icing assembly 44 is coupled to manifold 174. In this embodiment, manifold 174 is configured to channel air from air-flow control assembly 40 through de-icing conduit 180 to facilitate increasing a temperature of rotor blade 28. In the exemplary embodiment, de-icing conduit 180 is positioned adjacent leading edge 162 and/or trailing edge 164 to facilitate a transfer of heat from de-icing conduit 180 to rotor blade 28 at leading edge 162 and/or trailing edge 164, respectively. In an alternative embodiment, de-icing assembly 44 includes a first de-icing conduit 182 that is positioned adjacent leading edge 162 and a second de-icing conduit 184 that is positioned adjacent trailing edge 164. In the exemplary embodiment, de-icing conduit 180 is coupled to second flow control assembly 142 for receiving air from second flow control assembly 142. Alternatively, air-flow control assembly 40 does not include second flow control assembly 142. In such an embodiment, de-icing assembly 44 is configured to receive air from first flow control assembly 140 through hub cavity 106. In a further alternative embodiment, de-icing assembly 44 is coupled to shaft conduit 120 (shown in FIG. 3) for receiving air from first flow control assembly 140.

Figure 5:
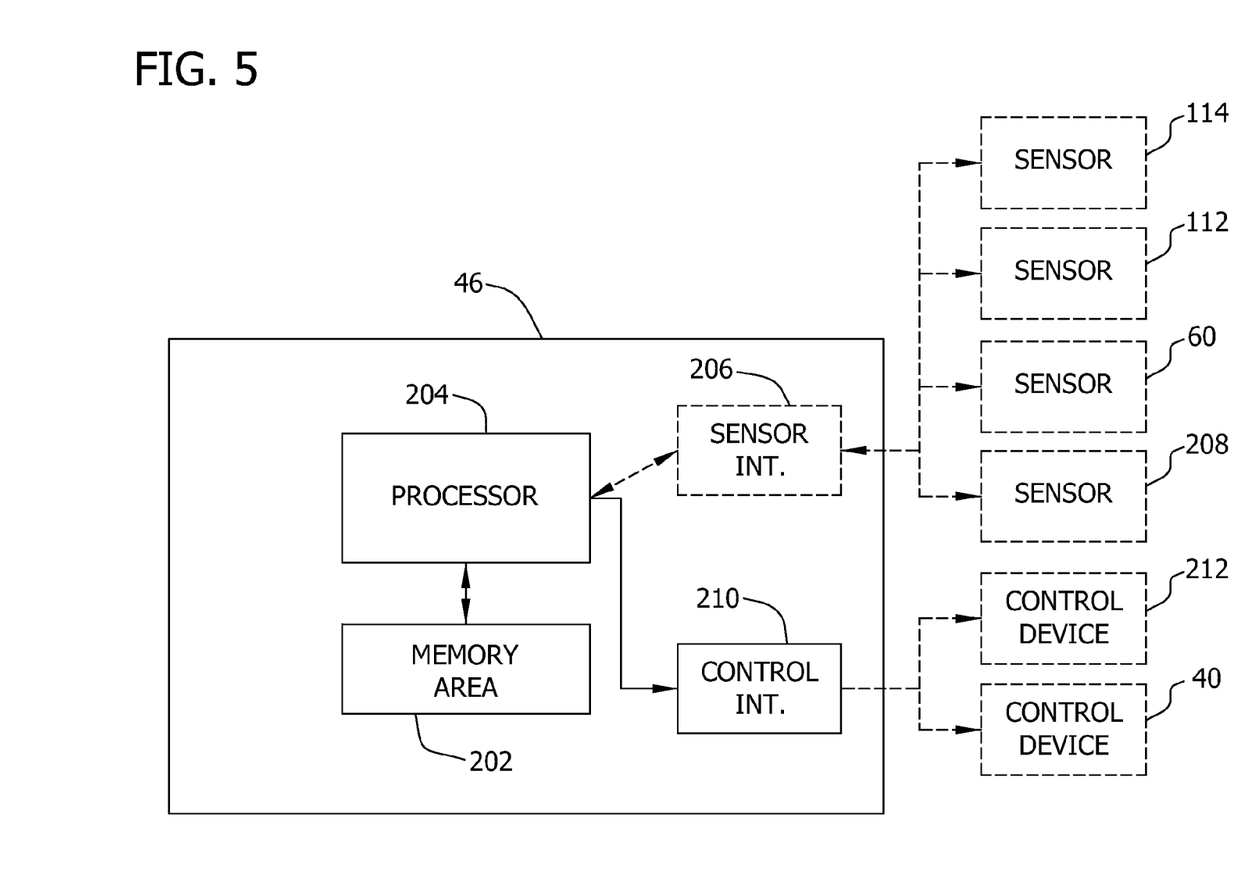
FIG. 5 is a block diagram illustrating an exemplary control system suitable for use with the air distribution system shown in FIG. 1.

FIG. 5 is a block diagram illustrating an exemplary control system 46. In the exemplary embodiment, control system 46 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, control system 46 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, control system 46 includes a memory area 202 configured to store executable instructions and/or one or more operating parameters representing and/or indicating an operating condition of wind turbine 10. Operating parameters may represent and/or indicate, without limitation, a tower temperature, a rotor blade temperature, a pitch angle, a wind speed, and/or a wind direction. Control system 46 further includes a processor 204 that is coupled to memory area 202 and is programmed to determine an operation of one or more wind turbine control devices 212, for example, air-flow control assembly 40, based at least in part on one or more operating parameters. In one embodiment, processor 204 may include a processing unit, such as, without limitation, an integrated circuit (IC), an application specific integrated circuit (ASIC), a microcomputer, a programmable logic controller (PLC), and/or any other programmable circuit. Alternatively, processor 204 may include multiple processing units (e.g., in a multi-core configuration).

In the exemplary embodiment, control system 46 includes a sensor interface 206 that is coupled to at least one sensor 208 such as, for example, velocity sensor 60, pitch sensor 112, and/or temperature sensor 114 for receiving one or more signals from sensor 208. Each sensor 208 generates and transmits a signal corresponding to an operating parameter of wind turbine 10. Moreover, each sensor 208 may transmit a signal continuously, periodically, or only once, for example, though other signal timings are also contemplated. Furthermore, each sensor 208 may transmit a signal either in an analog form or in a digital form. Control system 46 processes the signal(s) by processor 204 to create one or more operating parameters. In some embodiments, processor 204 is programmed (e.g., with executable instructions in memory area 202) to sample a signal produced by sensor 208. For example, processor 204 may receive a continuous signal from sensor 208 and, in response, periodically (e.g., once every five seconds) calculate an operation mode of air distribution system 30 based on the continuous signal. In some embodiments, processor 204 normalizes a signal received from sensor 208. For example, sensor 208 may produce an analog signal with a parameter (e.g., voltage) that is directly proportional to an operating parameter value. Processor 204 may be programmed to convert the analog signal to the operating parameter. In one embodiment, sensor interface 206 includes an analog-to-digital converter that converts an analog voltage signal generated by sensor 208 to a multi-bit digital signal usable by control system 46.

Control system 46 also includes a control interface 210 that is configured to control an operation of air distribution system 30. In some embodiments, control interface 210 is operatively coupled to one or more wind turbine control devices 212, for example, air-flow control assembly 40 (shown in FIG. 2).

Various connections are available between control interface 210 and control device 212 and between sensor interface 206 and sensor 208. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 10) network connection, whether wired or wireless.

In the exemplary embodiment, air distribution system 30 is configured to selectively operate in a first or de-icing mode, a second or active-flow control mode, and/or a third or temperature control mode. In one embodiment, air distribution system 30 is configured to operate in each of de-icing mode, active-flow control mode, and temperature control mode separately. Alternatively, air distribution system 30 may operate in each of de-icing mode, active-flow control mode, and temperature control mode simultaneously. As used herein, the term "de-icing mode" refers to a mode of operation in which air-flow control assembly 40 channels air from nacelle cavity 52 to de-icing assembly 44 to facilitate increasing a temperature of rotor blade 28. As used herein, the term "active-flow control mode" refers to a mode of operation in which air-flow control assembly 40 channels air from nacelle cavity 52 to active-flow control assembly 42 to facilitate manipulating boundary layer 172 across rotor blade 28. As used herein, the term "temperature control mode" refers to a mode of operation in which air-flow control assembly 40 channels air from tower cavity 80 and/or nacelle cavity 52 to ambient air 56 through nacelle aperture 54.

During operation of air distribution system 30 in de-icing mode, first flow control assembly 140 channels air from nacelle cavity 52 to hub cavity 106 through shaft conduit 120. De-icing assembly 44 channels air through rotor blade 28 adjacent leading edge 162 and/or trailing edge 164 to facilitate increasing a temperature of rotor blade 28. During operation of air distribution system 30 in active-flow control mode, first flow control assembly 140 channels air from nacelle cavity 52 to hub cavity 106 through shaft conduit 120. Active-flow control assembly 42 discharges air through apertures 176 and into boundary layer 172 to facilitate manipulating boundary layer 172 to adjust an aerodynamic efficiency of rotor blade 28. During temperature control mode, first flow control assembly 140 receives air from third flow control assembly 144 and channels the air to ambient air 56 through nacelle aperture 54. In each of de-icing mode, active-flow control mode, and temperature control mode, third flow control assembly 144 may be operated to channel air from tower cavity 80 to nacelle cavity 52 to facilitate reducing a temperature of tower cavity.

In the exemplary embodiment, control system 46 receives from temperature sensor 114 signals indicative of a temperature of rotor blade 28. Control system 46 is configured to operate air distribution system 30 in de-icing mode upon determining that a temperature of rotor blade 28 is less than a predefined temperature. Control system 46 is further configured to receive from sensor 60 signals indicative of a velocity of wind and to receive from pitch sensor 112 signals indicative of a pitch angle of rotor blade 28. Control system 46 is configured to calculate an aerodynamic efficiency of rotor blade 28 based on a velocity of wind and the pitch angle of rotor blade 28. Upon determining the aerodynamic efficiency of rotor blade 28 is different than a predefined aerodynamic efficiency, control system 46 is configured to operate air distribution system 30 in active-flow control mode. Control system 46 is further configured to receive from temperature sensor 114 signals indicative of a temperature within tower cavity 80 and to operate air distribution system 30 in temperature control mode when the sensed temperature is greater than a predefined temperature.

Figure 6:
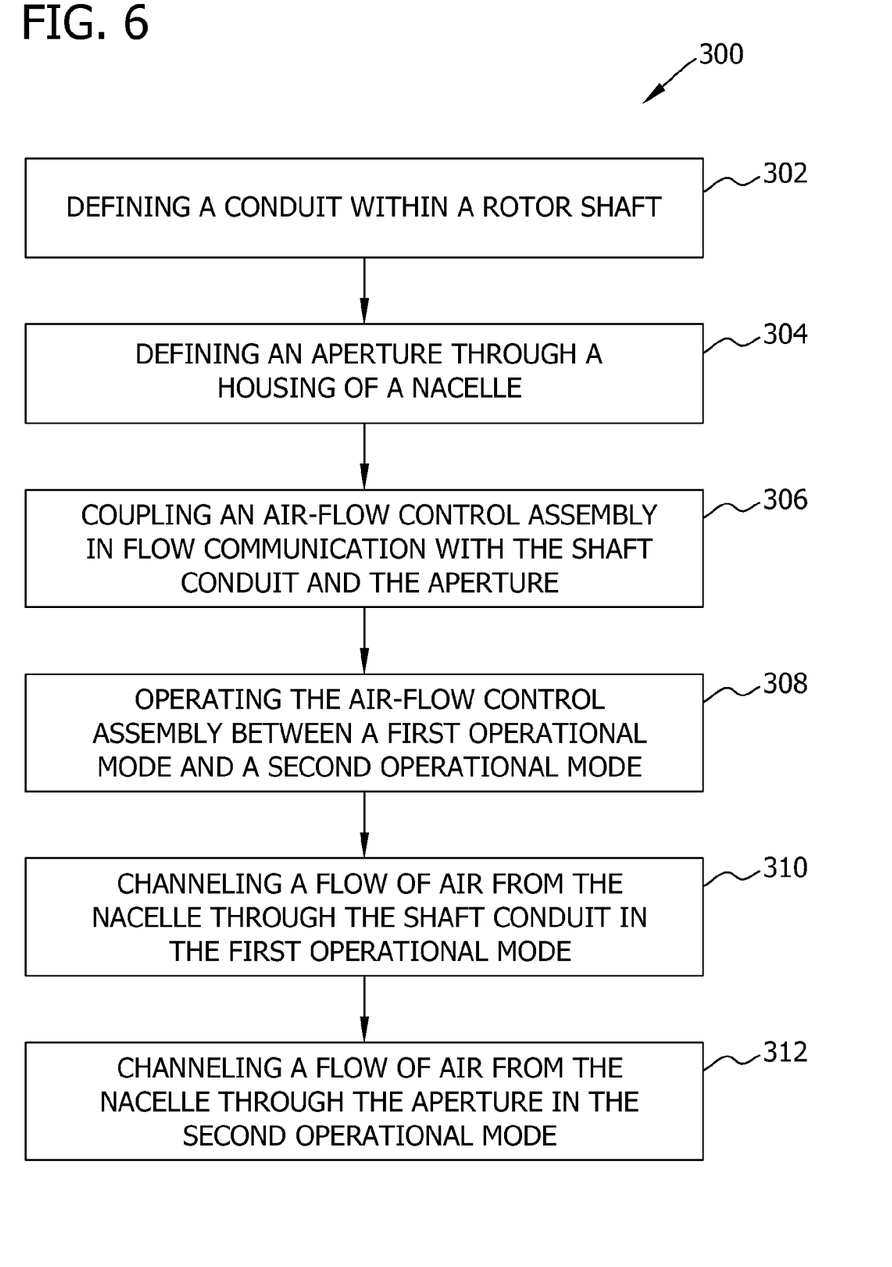
FIG. 6 is a flow chart illustrating an exemplary method of distributing air within the wind turbine shown in FIG. 1.

FIG. 6 is a flow chart illustrating an exemplary method 300 of distributing air within wind turbine 10. In the exemplary embodiment, method 300 includes defining 302 shaft conduit 120 within rotor shaft 24 and defining 304 aperture 54 through housing 48. Air-flow control assembly 40 is coupled 306 in flow communication with shaft conduit 120 and aperture 54. Air-flow control assembly 40 is operated 308 at a first operational mode or a second operational mode. Air-flow control assembly 40 channels 310 air from nacelle 16 through shaft conduit 120 in the first operational mode, and channels 312 air from nacelle 16 through aperture 54 in the second operational mode.

An exemplary technical effect of the system, method, and apparatus described herein includes at least one of: (a) transmitting, from a sensor to a control system, at least a first monitoring signal indicative of a velocity of wind; (b) transmitting at least a second signal indicative of a pitch of a rotor blade; (c) calculating, by the control system, an aerodynamic efficiency of the rotor blade based on the first signal and the second signal; (d) comparing the calculated aerodynamic efficiency to a predefined aerodynamic efficiency; and (e) operating an air-flow control assembly when the calculated aerodynamic efficient is different than the predefined aerodynamic efficiency.

The above-described system, method, and apparatus facilitate selectively channeling air from a nacelle to a hub of a wind turbine. More specifically, the air distribution system described herein includes an air-flow control assembly that is configured to selectively channel air from the nacelle to the hub and from the nacelle to ambient air to adjust a temperature within the wind turbine. By adjusting the temperature within the wind turbine, the cost of maintaining various wind turbine components can be reduced. In addition, the air distribution system described herein includes an active-flow control assembly for adjusting an aerodynamic efficiency of a wind turbine rotor blade and a de-icing assembly that facilitates increasing a temperature of a rotor blade to prevent a formation of ice across the rotor blade. As such, the annual energy production of the wind turbine can be increased.

Exemplary embodiments of a system, method, and apparatus for distributing air within a wind turbine are described above in detail. The system and method are not limited to the specific embodiments described herein, but rather, components of the assemblies and/or steps of the methods may be utilized independently and separately from other components and/or steps described herein. For example, the methods may also be used in combination with other wind turbine components, and are not limited to practice with only the air distribution systems as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An air distribution system for use with a wind turbine, the wind turbine including a nacelle coupled to a tower and a rotor rotatably coupled to the nacelle with a rotor shaft, the rotor including at least one rotor blade coupled to a hub, said air distribution system comprising:
 a conduit defined within the rotor shaft, said conduit providing flow communication between the nacelle and the rotor;
 an air-flow control assembly coupled in flow communication with said conduit, said air-flow control assembly configured to selectively channel air from the nacelle to the rotor and from the nacelle to ambient air;
 at least one sensor configured to sense a temperature within the nacelle; and,
 a controller coupled to said sensor and said air-flow control assembly, said controller configured to selectively channel air from the nacelle to the rotor and from said nacelle to ambient air based at least in part on the sensed nacelle temperature.

2. An air distribution system in accordance with claim 1, wherein said air-flow control assembly comprises a first flow control assembly positioned within the nacelle, said first flow control assembly coupled to said conduit for channeling air from the nacelle through said conduit to the rotor.

3. An air distribution system in accordance with claim 2, wherein the nacelle includes a housing that defines an aperture, the aperture providing flow communication between the nacelle and ambient air, said first flow control assembly coupled to the housing for selectively channeling air from the nacelle through said conduit to the rotor and through the aperture to ambient air.

4. An air distribution system in accordance with claim 3, further comprising an active-flow control assembly coupled in flow communication with said air-flow control assembly, said active-flow control assembly configured to channel air, from said air-flow control assembly to the rotor blade to facilitate manipulating a boundary layer across the rotor blade.

5. An air distribution system in accordance with claim 4, further comprising a de-icing assembly coupled in flow communication with said air-flow control assembly, said de-icing assembly configured to channel air from said air-flow control assembly to the rotor blade to facilitate preventing a formation of ice along the rotor blade.

6. An air distribution system in accordance with claim 5, wherein said air-flow control assembly further comprises a second flow control assembly positioned within the hub, said second flow control assembly coupled to said active-flow control assembly and said de-icing assembly for selectively channeling air from said first flow control assembly to at least one of said active-flow control assembly and said de-icing assembly.

7. An air distribution system in accordance with claim 2, wherein said air-flow control assembly comprises a second flow control assembly positioned within the tower, said second flow control assembly coupled in flow communication with said first flow control assembly for channeling air from the tower to said first flow control assembly.

8. A wind turbine, comprising:
 a tower;
 a nacelle coupled to said tower;
 a generator positioned within said nacelle;
 a rotor comprising at least one rotor blade coupled to a hub;
 a rotor shaft rotatably coupling said rotor to said generator; and,
 an air distribution system coupled to said nacelle, said air distribution system comprising:
  a conduit defined through said rotor shaft, said conduit providing flow communication between said nacelle and said rotor;
  an air-flow control assembly coupled in flow communication with said conduit, said air-flow control assembly configured to selectively channel air from said nacelle to said rotor and from said nacelle to ambient air;
  at least one sensor configured to sense a temperature of said nacelle; and,
  a controller coupled to said sensor and said air-flow control assembly, said controller configured to selectively channel air from the nacelle to the rotor and from said nacelle to ambient air based at least in part on the sensed nacelle temperature.

9. A wind turbine in accordance with claim 8, wherein said nacelle comprises a housing defining at least one aperture providing flow communication between said nacelle and ambient air, said air-flow control assembly comprising a first flow control assembly positioned within said nacelle, said first flow control assembly coupled to said conduit and to said aperture, said first flow control assembly configured to selectively channel air from said nacelle through said conduit and through said nacelle aperture.

10. A wind turbine in accordance with claim 9, wherein said air distribution system further comprises an active-flow control assembly coupled in flow communication with said air-flow control assembly, said active-flow control assembly configured to channel air from said air-flow control assembly to said rotor blade to facilitate manipulating a boundary layer across said rotor blade.

11. A wind turbine in accordance with claim 10, wherein said air distribution system further comprises a de-icing assembly coupled in flow communication with said air-flow control assembly, said de-icing assembly configured to channel air from said air-flow control assembly to said rotor blade to facilitate preventing a formation of ice along said rotor blade.

12. A wind turbine in accordance with claim 11, wherein said air-flow control assembly further comprises a second flow control assembly positioned within said hub, said second flow control assembly coupled to said active-flow control assembly and said de-icing assembly for selectively channeling air from said first flow control assembly to at least one of said active-flow control assembly and said de-icing assembly.

13. A wind turbine in accordance with claim 9, wherein said air-flow control assembly comprises a second flow control assembly positioned within said tower, said second flow control assembly coupled in flow communication with said first flow control assembly for channeling air from said tower to said first flow control assembly.

14. A wind turbine in accordance with claim 13, further comprising at least one enclosure positioned adjacent an outer surface of said tower, said second flow control assembly coupled in flow communication with said enclosure for channeling air from said enclosure to said first flow control assembly.

15. A method of distributing air within a wind turbine, the wind turbine including a nacelle coupled to a tower, and a rotor coupled to the nacelle with a rotor shaft, the rotor including at least one rotor blade coupled to a hub, said method comprising:
- coupling an air-flow control assembly in flow communication with the nacelle, the rotor, and ambient air outside the nacelle;
- transmitting, by a sensor to a controller, a signal indicative of a temperature within a nacelle; and,
- configuring the air-flow control assembly to operate in one of a plurality of operational modes based at least in part on the sensed nacelle temperature, the air-flow control assembly configured to channel air from the nacelle to the rotor in a first operational mode of the plurality of operational modes, and the air-flow control assembly configured to channel air from the nacelle to ambient air in a second operational mode of the plurality of operational modes.

16. A method in accordance with claim 15, further comprising:
- defining a conduit within the rotor shaft, the conduit providing flow communication between the nacelle and the hub; and,
- configuring the air-flow control assembly to operate in the first operational mode to channel air from the nacelle through the rotor shaft to the hub.

17. A method in accordance with claim 16, further comprising:
- defining an aperture through a housing of the nacelle, the aperture providing flow communication between the nacelle and ambient air; and,
- configuring the air-flow control assembly to operate in the second operational mode to channel air from the nacelle through the aperture to ambient air.

18. A method in accordance with claim 16, further comprising:
- coupling a de-icing assembly to the rotor blade and to the air-flow control assembly; and,
- configuring the air-flow control assembly to operate in a third operational mode of the plurality of operational modes to channel air from the nacelle to the de-icing assembly in the third operational mode.

19. A method in accordance with claim 15, further comprising:
- coupling an active-flow control assembly to the rotor blade and to the air-flow control assembly; and,
- configuring the air-flow control assembly to operate in the first operational mode to channel air from the nacelle to the active-flow control assembly.

20. A method in accordance with claim 15, further comprising:
- coupling the air-flow control assembly in flow communication with the tower; and,
- configuring the air-flow control assembly to operate to channel air from the tower to the nacelle in one of the first operational mode and the second operational mode.

* * * * *